US011165660B2

(12) United States Patent
Chang et al.

(10) Patent No.: US 11,165,660 B2
(45) Date of Patent: Nov. 2, 2021

(54) DYNAMICALLY GROUPING MONITORED RESOURCES IN A CLOUD ENVIRONMENT TO COLLECTIONS REPRESENTING A COMPOSITE APPLICATION

(71) Applicant: International Business Machines Corporation, Armonk, NY (US)

(72) Inventors: John Y. Chang, Austin, TX (US); Ching Y. Chao, Austin, TX (US); Timothy L. Land, Moorpark, CA (US); Lorne D. Long, Hurdle Mills, NC (US); James N. Paterson, Thousand Oaks, CA (US); David M. Reichek, Hutto, TX (US); John C. Sanchez, Pflugerville, TX (US); Donald R. Woods, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1596 days.

(21) Appl. No.: 13/888,629

(22) Filed: May 7, 2013

(65) Prior Publication Data

US 2014/0337746 A1 Nov. 13, 2014

(51) Int. Cl.
*H04L 12/24* (2006.01)

(52) U.S. Cl.
CPC ............ *H04L 41/22* (2013.01); *H04L 41/085* (2013.01); *H04L 41/0893* (2013.01)

(58) Field of Classification Search
CPC .... H04L 41/085; H04L 41/0893; H04L 41/22
See application file for complete search history.

(56) References Cited

U.S. PATENT DOCUMENTS

2007/0033571 A1* 2/2007 Moore ................... G06Q 10/06
717/104
2010/0088205 A1 4/2010 Robertson
(Continued)

FOREIGN PATENT DOCUMENTS

WO WO2011025670 A1 3/2011
WO WO2011067099 A2 6/2011

OTHER PUBLICATIONS

Qi Zhang et al., "Cloud Computing: State-of-the-art and Research Challenges," J Internet Serv Appl, The Brazilian Computer Society, pp. 7-18, published Apr. 20, 2010.
(Continued)

*Primary Examiner* — William G Trost, IV
*Assistant Examiner* — Christopher P Cadorna
(74) *Attorney, Agent, or Firm* — Kenneth Han (57) ABSTRACT

Provided are techniques for grouping resources based upon ownership in a cloud environment into a collection representing a composite application corresponding to a particular user; automatically monitoring the resources across two or more virtual machines and two or more physical computing devices; and displaying the monitored resources in a graphical user interface (GUI) in a context associated with the composite application for managing the composite application and the resources, wherein the resources are provided as one or more of a platform as service (PaaS) environment and an infrastructure as Service (IaaS) environment.

18 Claims, 8 Drawing Sheets

(56) References Cited

U.S. PATENT DOCUMENTS

| | | | | |
|---|---|---|---|---|
| 2010/0269053 A1* | 10/2010 | Lingafelt | ............... | A63F 13/12 |
| | | | | 715/757 |
| 2011/0055398 A1 | 3/2011 | Dehaan et al. | | |
| 2011/0295727 A1 | 12/2011 | Ferris et al. | | |
| 2012/0096165 A1 | 4/2012 | Madduri et al. | | |
| 2014/0195666 A1* | 7/2014 | Dumitriu | ............ | H04L 12/4625 |
| | | | | 709/223 |
| 2014/0201824 A1* | 7/2014 | Agbabian | ........... | G06F 21/6245 |
| | | | | 726/6 |
| 2014/0214496 A1* | 7/2014 | Macbeath | .......... | G06Q 30/0283 |
| | | | | 705/7.37 |
| 2015/0040017 A1* | 2/2015 | Roche | .................... | G06F 11/32 |
| | | | | 715/736 |

OTHER PUBLICATIONS

Amazon, "Tag Your Amazon EC2 Resources," Amazon.com, [accessed Jun. 29, 2021], Retrieved from the Internet <https://docs.aws.amazon.com/AWSEC2/latest/UserGuide/Using_Tags.html>, 14 pgs.

IBM, "IBM Documentation," IBM.Com, [accessed Jun. 29, 21], Retrieved from the Internet: <https://www.ibm.com/docs/en>, 5 pgs.

\* cited by examiner

DYNAMICALLY GROUPING MONITORED RESOURCES IN A CLOUD ENVIRONMENT TO COLLECTIONS REPRESENTING A COMPOSITE APPLICATION

FIELD OF DISCLOSURE

The claimed subject matter relates generally to the management of computing resources in a cloud environment.

SUMMARY

Provided are techniques for the management of computing resources in a cloud environment. In a typical data center, there are many applications and application "owners." Each owner is responsible for the health and availability of their corresponding applications and such health and availability is determined by monitoring agents. Each application owner is typically restricted to view only the health and availability of their own applications.

In a traditional data center, the management process proceed as follows:
1) Plan application deployment;
2) Acquire hardware;
3) Deploy composite application across several machines;
4) Deploy and connect monitoring agents;
5) Monitoring agents become visible in a console with the monitored resources displayed as unrelated nodes in a tree or flat view;
6) Request that a monitoring administrator group resources so that they can be viewed in a single logical view; and
7) Request administrator to grant access to the logical view for specified users.

However, in a cloud environment, this type of administration is nearly impossible because applications and virtual machines (VMs) may be dynamically provisioned and de-provisioned and because new VMs may be associated with existing applications for scaling purposes.

Provided are techniques for grouping resources based upon ownership in a cloud environment into a collection representing a composite application corresponding to a particular user; automatically monitoring the resources across two or more virtual machines and two or more physical computing devices; and displaying the monitored resources in a graphical user interface (GUI) in a context associated with the composite application for managing the composite application and the resources, wherein the resources are provided as one or more of a platform as service (PaaS) environment and an infrastructure as Service (IaaS) environment.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE DRAWINGS

A better understanding of the claimed subject matter can be obtained when the following detailed description of the disclosed embodiments is considered in conjunction with the following figures.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational actions to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
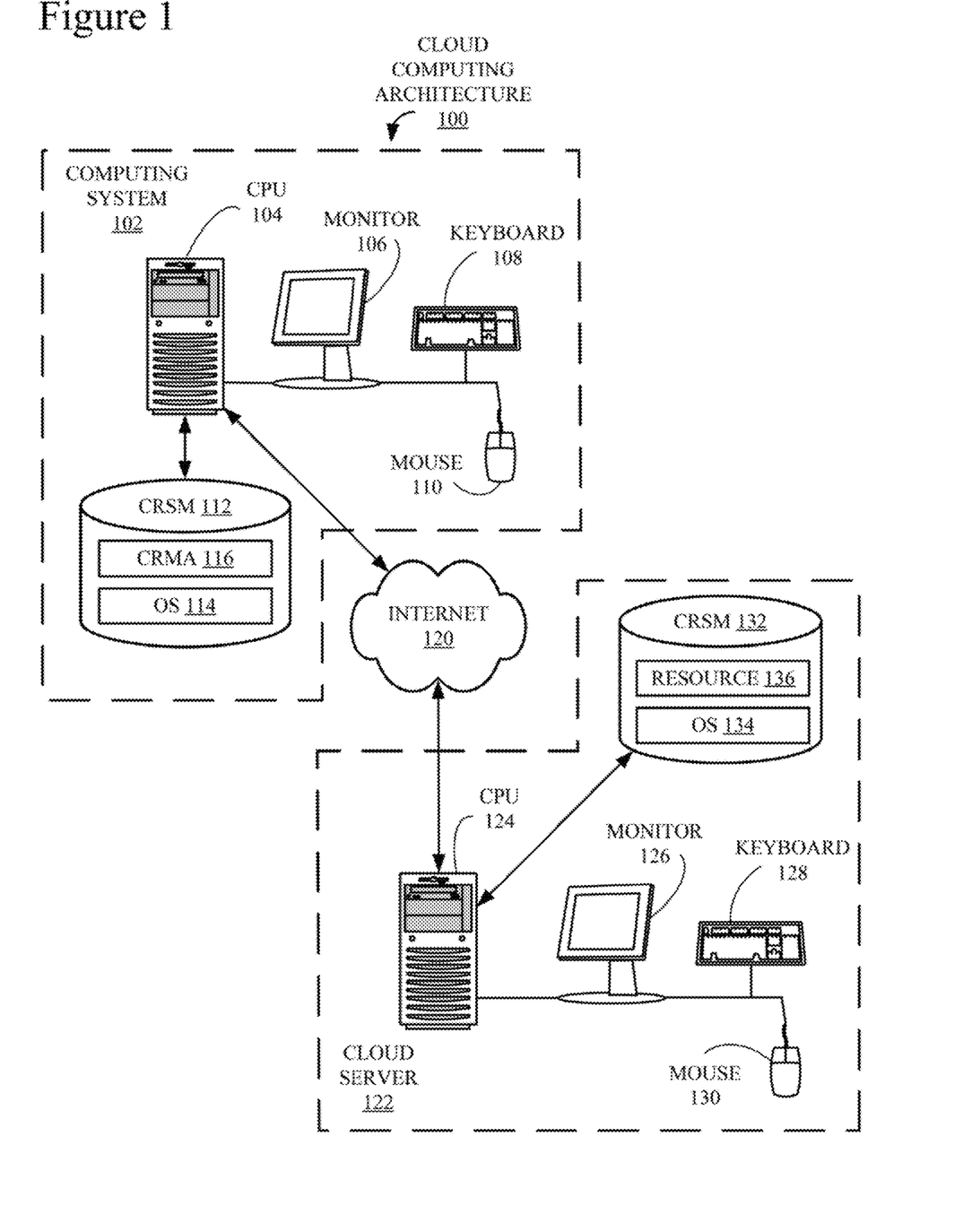
FIG. 1 is a block diagram of a computing block diagram of a simple cloud computing architecture, including a Cloud Resource Monitoring Agent (CRMA), on which the claimed subject matter may be implemented.

Turning now to the figures, FIG. 1 is a block diagram of a simple cloud computing architecture 100 on which the claimed subject matter may be implemented. A computing system 102 includes a central processing unit (CPU) 104, coupled to a monitor 106, a keyboard 108 and a pointing device, or "mouse," 110, which together facilitate human interaction with computing system 102 and other elements of cloud architecture 100. Also included in computing system 102 and attached to CPU 104 is a computer-readable storage medium (CRSM) 112, which may either be incorporated into computing system 102 i.e. an internal device, or attached externally to CPU 104 by means of various, commonly available connection devices such as but not limited to, a universal serial bus (USB) port (not shown). CRSM 112 is illustrated storing an operating system (OS) 114 and a Cloud Resource Monitoring Agent (CRMA) 116. In the following examples, CRMA 116 includes logic for implementing the claimed subject matter and is described in more detail below in conjunction with FIGS. 2-8.

Computing system 102 and CPU 104 are connected to the Internet 120, which is also connected to a cloud server 122. Although in this example, computing system 102 and server 122 are communicatively coupled via the Internet 120, they could also be coupled through any number of communication mediums such as, but not limited to, a local area network (LAN) (not shown). Like computing system 102, cloud server 122 includes a central processing unit (CPU) 124, coupled to a monitor 126, a keyboard 128, a mouse 130, which facilitate human interaction with cloud server 122 and other elements of cloud architecture 100, and a CRSM 132. CRSM 132 is illustrated storing an OS 134 and a cloud based resource 136. Cloud based resource 136 may be any actual or virtual resource commonly available via cloud based computing, such as, but not limited to, data storage, operating systems, message queues and application servers. One with skill in the relevant arts will appreciate the many types of resources that might be available in a cloud computing environment such as cloud computing architecture 100. Further, it should be noted there are many possible computing system configurations and that cloud computing architecture 100, computing system 102 and cloud server 122 are only simple examples.

Figure 2:
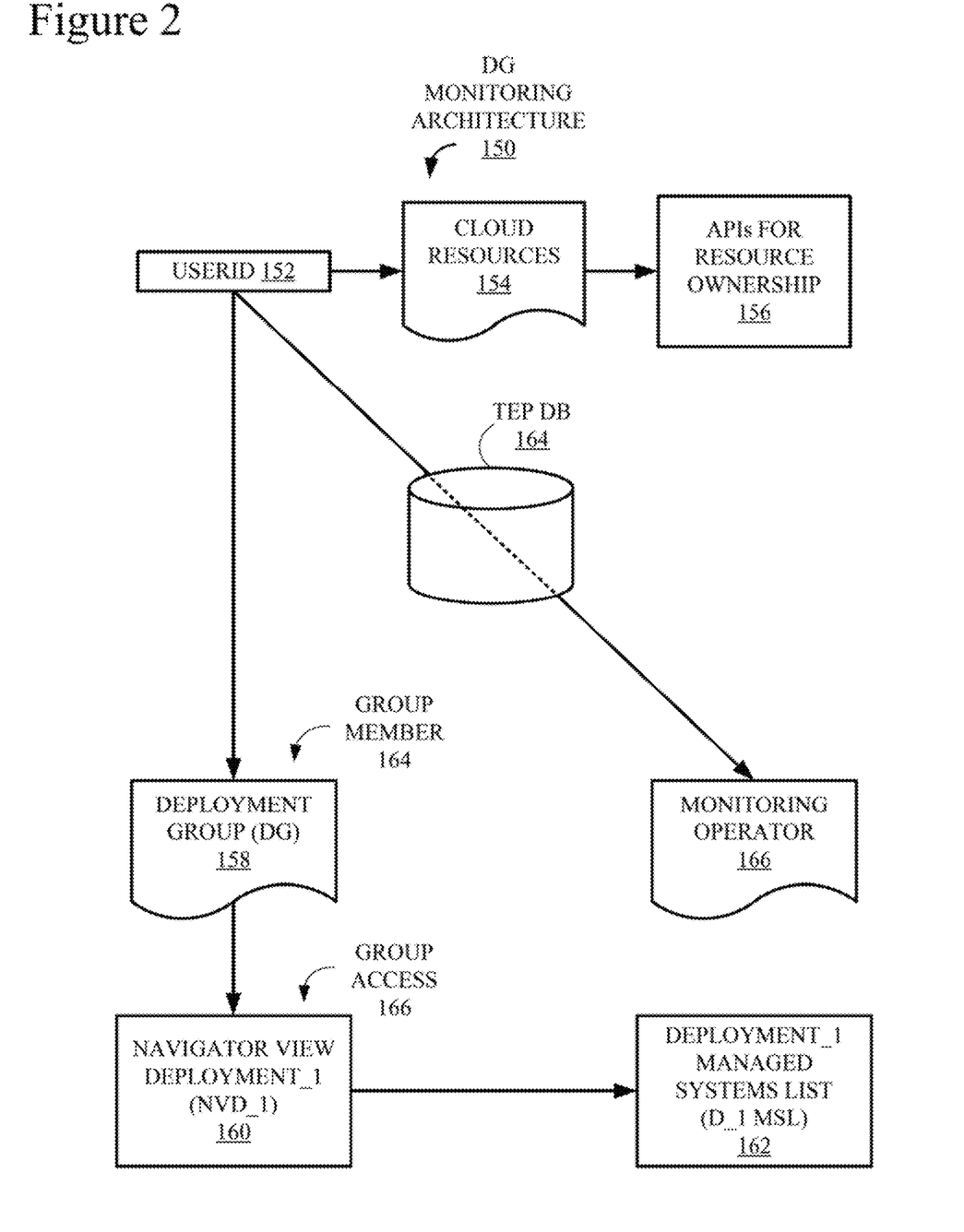
FIG. 2 is a block diagram of a Deployment Group (DG) Monitoring Architecture, including selected elements, that may implement the claimed subject matter.

FIG. 2 is a block diagram of a Deployment Group (DG) Monitoring Architecture 150, including selected elements and the relationships among the elements, that may implement the claimed subject matter. In this example, a userID 152 is employed to access cloud resources 154. Also provided are application user interfaces (APIs) for Resource Ownership 156. As the name implies, APIs for Resource Ownership 156 provides means for a user associated with userID 152 to claim ownership of various resources such as resource 136 (FIG. 1).

Associated with userID 152 is a deployment group (DC) 158. Associated with DC 158 is a Navigator View Deployment, i.e. NVD_1, 160, which is in turn associated with a Deployment Managed. System List, i.e. D_1 MSL, 162. As explained in more detail below in conjunction with FIGS. 3-8, DG 158, NVD_1 160 and D_1 MSL 162 are employed in accordance with the disclosed technology to enable the user associated with userID 152 to manage and monitor cloud based resources. In addition, it should be understood that any particular user may be associated with multiple DGs.

Also included in DG Monitoring Architecture 150 is an enterprise portal, which in this example is a Tivoli Enterprise Portal (TEP) database (DB) 164, TEP DB 164 provides the user associated with userID 152 access to a Monitoring Operator 166. Interactions among elements 152, 154, 156, 158, 160, 162, 164 and 166 are explained in more detail below in conjunction with FIGS. 3-8.

Figure 3:
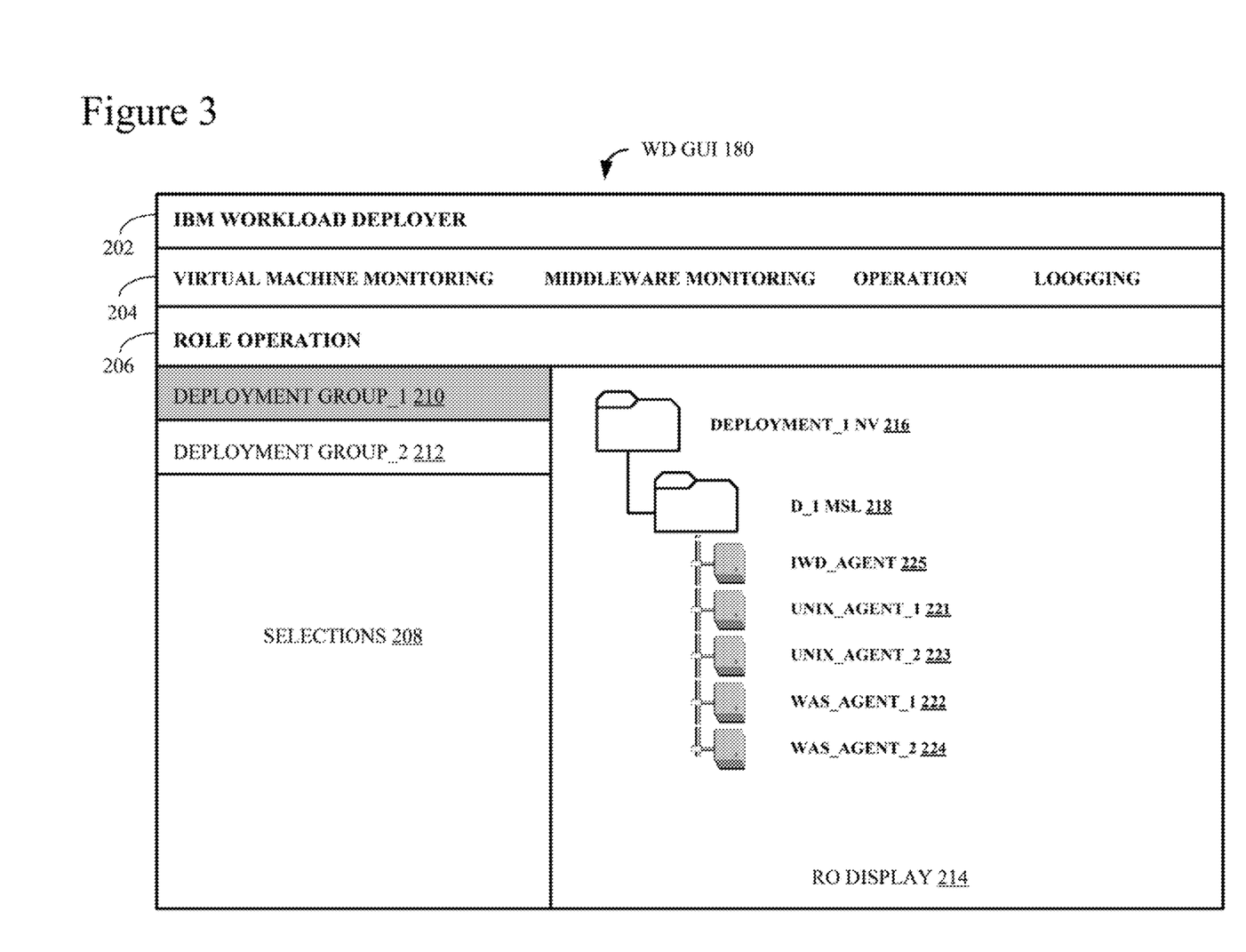
FIG. 3 is a block diagram of a Workload Deployer (WD) graphical user interface (GUI) that may implement aspects of the claimed subject matter.

FIG. 3 is a block diagram of a Workload Deployer (WD) graphical user interface (GUI) 180 that may implement aspects of the claimed subject matter. In this example, WD GUI 180 is a simple GUI that may be used to initiate, access and control CRMA 116, introduced above in conjunction with FIG. 1. In this example, logic associated with WD GUI 180 is stored on CRSM 112 (FIG. 1) in conjunction with CRMA 116 (FIG. 1) and executed on one or more processors (not shown) of CPU 104 (FIG. 1) of computing system 102 (FIG. 1).

A title bar 202 indicates that WD GUI 180 is, in this example, associated with an International Business Machines (IBM) Workload Deployer. A function bar 204 indicates a few available operations, which in this example include "Virtual Machine Monitoring," "Middleware Monitoring," "Operation" and "Logging." A selection title bar 206, entitled "Role Operation," determines the types of elements that are displayed in a Selections section 208. In this example, deployment groups are displayed, specifically a selection for Deployment Group_1 210 (see 158, FIG. 2) and a selection for Deployment Group_2 212. The greying of the selection for Deployment Group_1 210 indicates that DG_1 158 is currently selected. Information associated with the selected element, i.e. DG_1 158, is displayed in a Role Operation (RO) Display 214.

Displayed in RO display 214 are various icons representing components that may be managed in accordance with the claimed subject matter, including a deployment_1 navigation view (NV) 216, which represents NVD_1 160 (FIG. 2), and a D_1 managed system list (MSL) 218, which represents D_1 MSL 162 (FIG. 2). Associated with D_1 MSL 218, and by inference to D_1 MSL 162, are a number of icons representing plugin modules that act as agents (see FIG. 6). The plugin/agent icons include an IBM Workload Deployer agent (IWD_agent) 225 (see 325, FIG. 6), a unix_agent_1 221 (see 321, FIG. 6), a unix_agent_2 223 (see 323, FIG. 6), a Websphere Application server agent (WAS_agent_1) 222 (see 322, FIG. 6) and a WAS_agent_2 224 (see 324, FIG. 6). Plugin modules 221-225 and the use of WD GUI 180 are explained in more detail below in conjunction with FIGS. 4-8.

Figure 4:
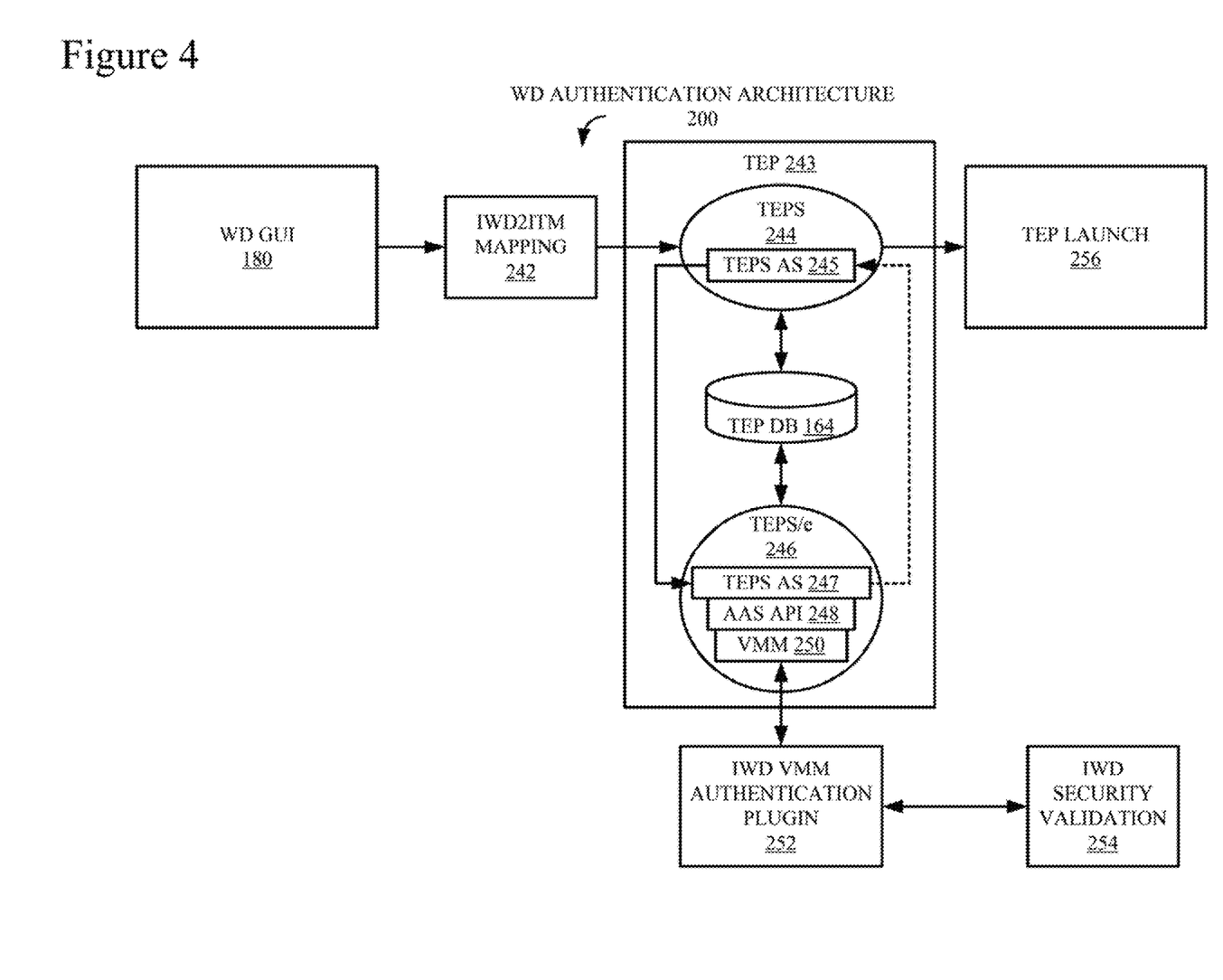
FIG. 4 is a block diagram of a WD Authentication Architecture, including, selected elements, that may facilitate implementation of the claimed subject matter.

FIG. 4 is a block diagram of a WD Authentication Architecture 200, including selected elements, that may facilitate implementation of the claimed subject matter. FIG. 4 introduces elements of WD Authentication Architecture 200; the manner in which the elements interact is explained in more detail below in conjunction with FIGS. 5-8.

WD GUI 180, first introduced above in conjunction with FIG. 3, is shown. When a user clicks on one of selections 108 (FIG. 3) such as deployment group_1 210, a workload deployer, which in this example is an IBM Workload Deployer (IWD), to Monitoring module, which in this example is a IBM Tivoli Monitoring (ITM), a mapping module (IWD2ITM) 242 is employed to map the user's ID on computing system 102 (FIG. 1) on to an existing cloud user ID and generate, from an IWD security token corresponding to the user's ID, a lightweight third party authentication (LTPA) token (not shown), which may be used to access cloud resources. The LTPA token is employed to access an enterprise portal, which in this example is a Tivoli Enterprise Portal (TEP) 243.

TEP 243 is comprised of a TEP server (TEPS) 244 and a TEPS extended services (TEPS/e) 246, both of which are coupled to TEP DB 164, first introduced above in conjunction with FIG. 2. TEPS 244 and TEPS/e 246 each include a TEPS authentication service (AS), i.e. TEPS ASs 245 and 247, respectively. Coupled to TEPS AS 247 of TEPS/e AS 247 is an application programming interface (API) for Infrastructure as a Service (IaaS) and Platform as a Service (PaaS) cloud resources, or "AAS API" 248, that provides access to a virtual machine manager (VMM) 250. An IWD VMM authentication plugin 252 and an IWD security validation 254 employ the LTPA token generated by IWD2ITM mapping 242 to validate the user with respect to VMM 250. Once a user is authenticated, TEP 243 is also employed to generate a TEP launch 256, which provides a user with a portal to TEP 243, TEPS 244 and TEPS/e 246.

Figure 5:
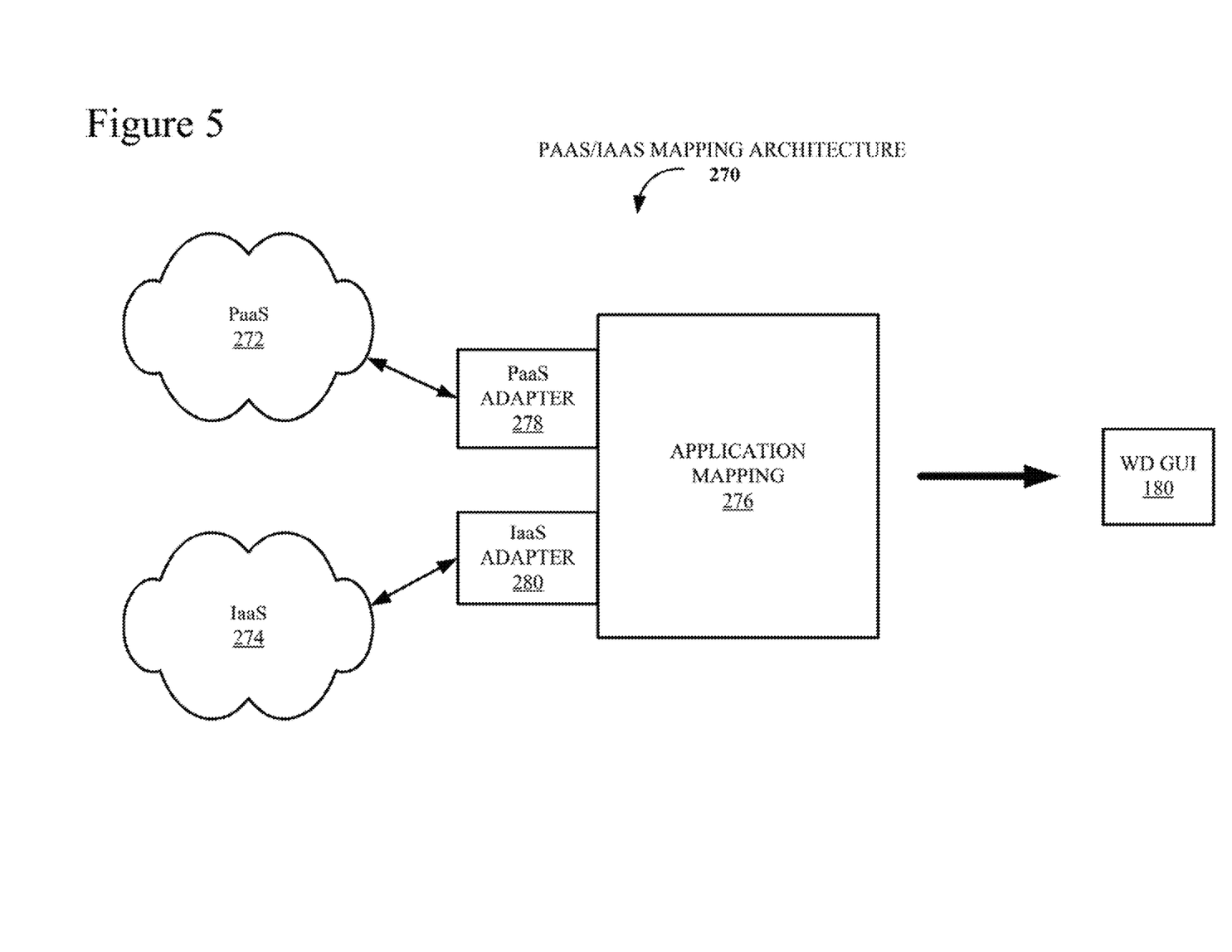
FIG. 5 is a block diagram of a Platform as Service (PaaS)/Infrastructure as Service (IaaS) Mapping Architecture, including selected elements, that may implement aspects of the claimed subject matter.

FIG. 5 is a block diagram of a PaaS/IaaS Mapping Architecture 270, including selected elements, that may implement aspects of the claimed subject matter. In this example, platforms managed in accordance with the disclosed technology include, but are not limited to, PaaS resources, or simple "PaaS," 272 and IaaS resources, or simply "IaaS," 274. Each of PaaS 272 and IaaS 274 communicate with an application mapper 276 via an adapter specifically configured for the corresponding environment, i.e. a PaaS adapter 278 and an IaaS adapter 280, respectively. In this manner, different environments may be added, removed and managed in accordance with the claimed subject matter more efficiently.

Application mapping 276 communicates with WD GUI 180, which was introduced above in conjunction with FIGS. 3 and 4, and enables logical groupings such as DG 158 of virtual machines such as VM_1 304 (see FIG. 6) and VM_2 306 (see FIG. 6) to be displayed in and managed by WD GUI 180. Adapters 278 and 280 call on application mapping 276 when events such as, but not limited to, a virtual module (see 304 and 306, FIG. 6) is added deleted or a group is added or deleted. Adapters such as adapters 278 and 280 also implement methods that return a group name, such as DC 158, to which a particular monitoring agent belongs and creates an internal data structure, or list, to add, remove and move agents to different groups. In this manner, agents can be added, removed and moved based, among other reasons, based upon scaling requirements.

Figure 6:
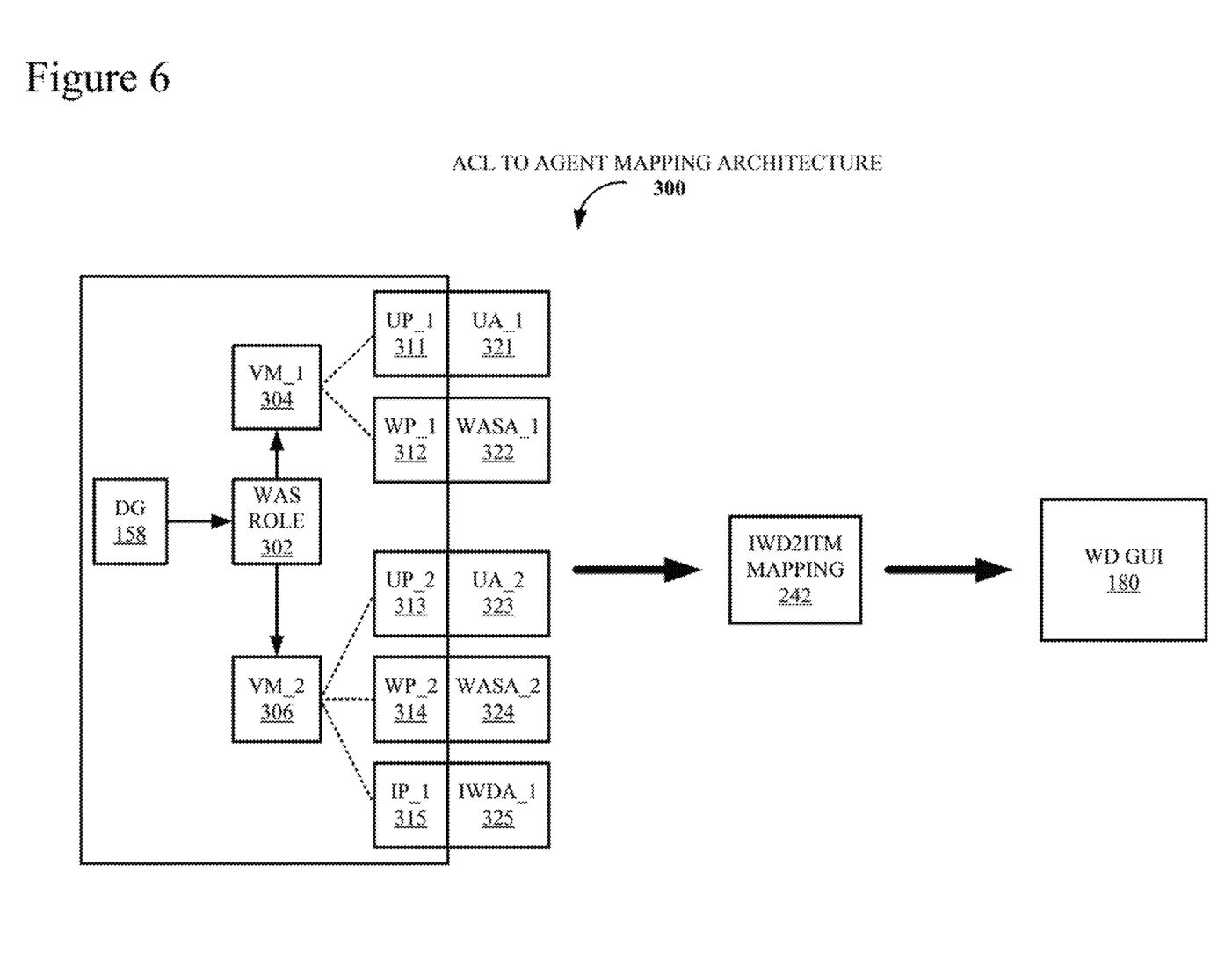
FIG. 6 is a block diagram or an Access Control List (ACL) to Agent Mapping architecture that employs plugin modules to implement aspects of the claimed subject matter.

FIG. 6 is a block diagram of an Access Control List (ACL) to Agent Mapping architecture 300 that employs plugin/agent modules to implement aspects of the claimed subject matter. In this example, deployment_1 210 (FIG. 3) is associated with a WAS role 302, which in turn is associated with a pair of virtual machines, i.e. a VM_1 304 and a VM_2 306. Each of VM_1 304 and VM_2 306 are responsible for managing a number of plugin/agent components. Specifically, VM_1 304 manages and provides access to a unix plugin associated with a unix agent, i.e. UP_1 311 and a UA_1 321, and a WAS plugin associated with a WAS agent, i.e. WP_1 312 and a WASA_1 322. VM_2 306 manages and provides access to a unix plugin agent associated with a unix agent, i.e., a UP_1 313 and a UA_2 324, a WAS plugin associated with a WAS agent, i.e. WP_2 314 and a WASA_2 324, and a IWD plugin associated with a IWD agent, i.e., a IP_1 315 and a IWDA_1 325. In this manner, different types of applications and resources, including but not limited to Unix, WAS and IWD applications and resources can be organized and grouped into separate logical views that represent a user's applications. In addition, virtual modules can be added, removed and managed in accordance with the claimed subject matter. In this example, agents 312-325 interact with IWD2ITM mapping 242 (FIG. 4), which in turn communicates with WD GUI 180 (FIGS. 3-5).

Figure 7:
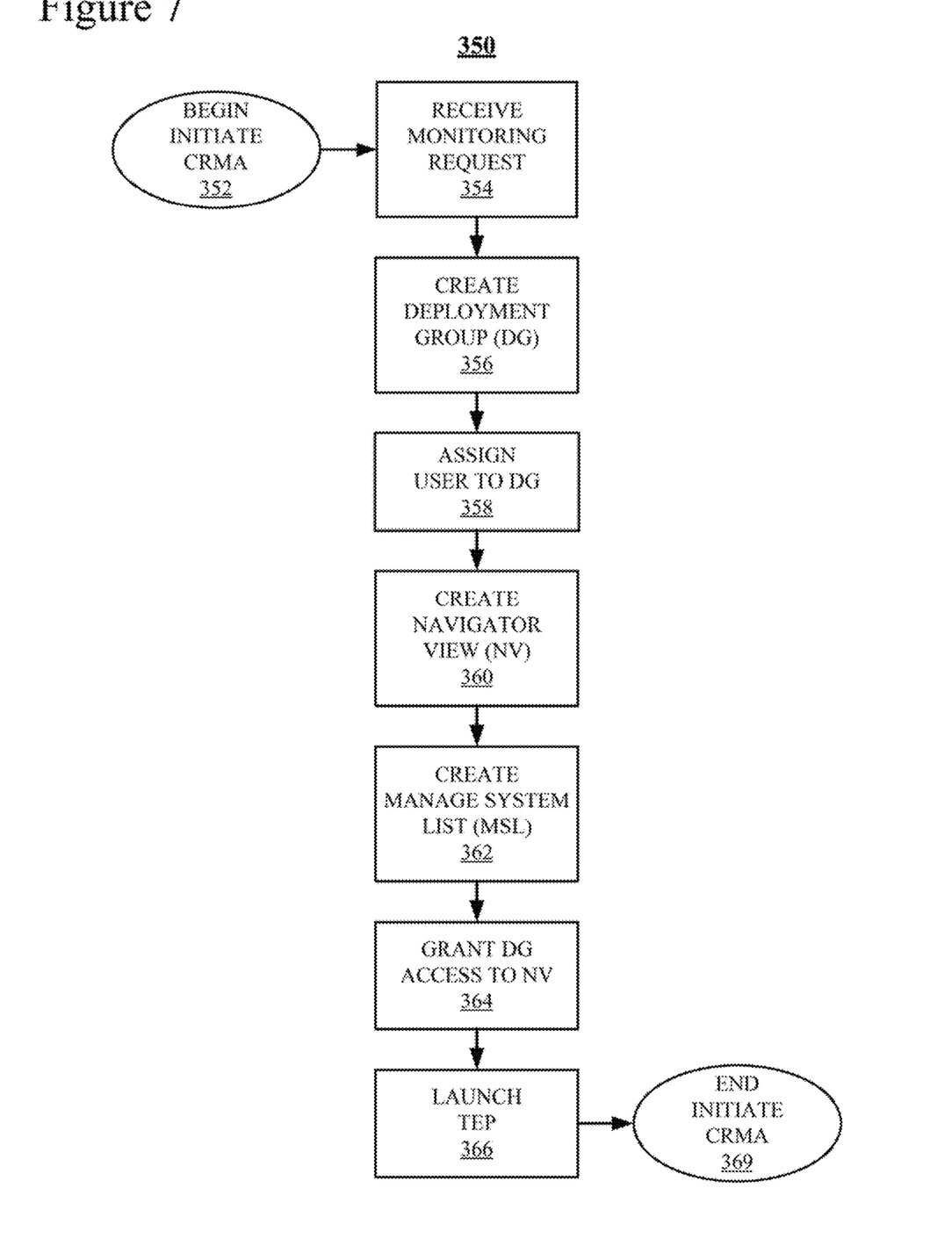
FIG. 7 is a flowchart of an Initiate CRMA process that may implement aspects of the claimed subject matter.

FIG. 7 is a flowchart of an Initiate CRMA process 350 that may implement aspects of the claimed subject matter. In this example, process 350 is associated with logic stored on CRSM 112 (FIG. 1) in conjunction with CRMA 116 (FIG. 1) and executed on one or more processors (not shown) of CPU 104 (FIG. 1) and computing system 102 (FIG. 1).

Process 350 starts in a "Begin Initiate CRMA" block 352 and proceeds immediately to a "Receive Monitoring Request" block 354. During processing associated with block 354, a request to monitor one or more resources is received. In this example, the request is received at CRMA 116 from an administrator or user not shown) of computing system 102 and one such resource is resource 136 (FIG. 1) hosted by cloud server 122 (FIG. 1). In addition, resource 136 is member of cloud resources 154 (FIG. 2). During processing associated with a "Create Deployment Group (DG)" block 356, a deployment group (DG) is generated, which in this example is DG 158 (FIG. 2). At this point, DG 158 does not have any assigned resources.

During processing associated with an "Assign User to DG" block 358, a user is associated with DG 158 by assigning the user's ID to DG 158. The user may either be the administrator who initiated process 350 or another user on whose behalf the administrator is working. Either way, in this example, the user is the user corresponding to userID 152 (FIG. 2). It should be understood that multiple users may be associated with any particular DG. During processing associated with a "Create Navigator View (NV)" block 360, a NV is generated, which in this example is Navigator View Deployment_1 (NVD_1) 160 (FIG. 2). One example of an aspect of NVD_1 160 may be WD GUI 180 (FIG. 3).

During processing associated with a "Create Mange System List (MSL)" block 362, a MSL associated with NVD_1 160 is generated. In this example, the MSL generated is D_1 MSL 162 (FIG. 2). At this point, resource 136 is added to D_1 MSL 162 and thereby becomes a managed resource. For course, other resources may be added as well. During processing associated with a "Grant DG Access to NV" block 314, DG 158, created during processing associated with block 356, is granted access to NVD_1 160, created during processing associated with block 360 and, by extension, the users or users associated with DG 158, such as the user associated with userID 152 during processing associated with block 358, are granted access as well.

During processing associated with a "Launch TEP" block 316, TEP 153 (FIG. 4) is initiated and takes over the monitoring of the resources, such as resource 136, listed in D_1 MSL 162. Finally, during processing associated with an "End Initiate CRMA" block 369, process 350 is complete.

Figure 8:
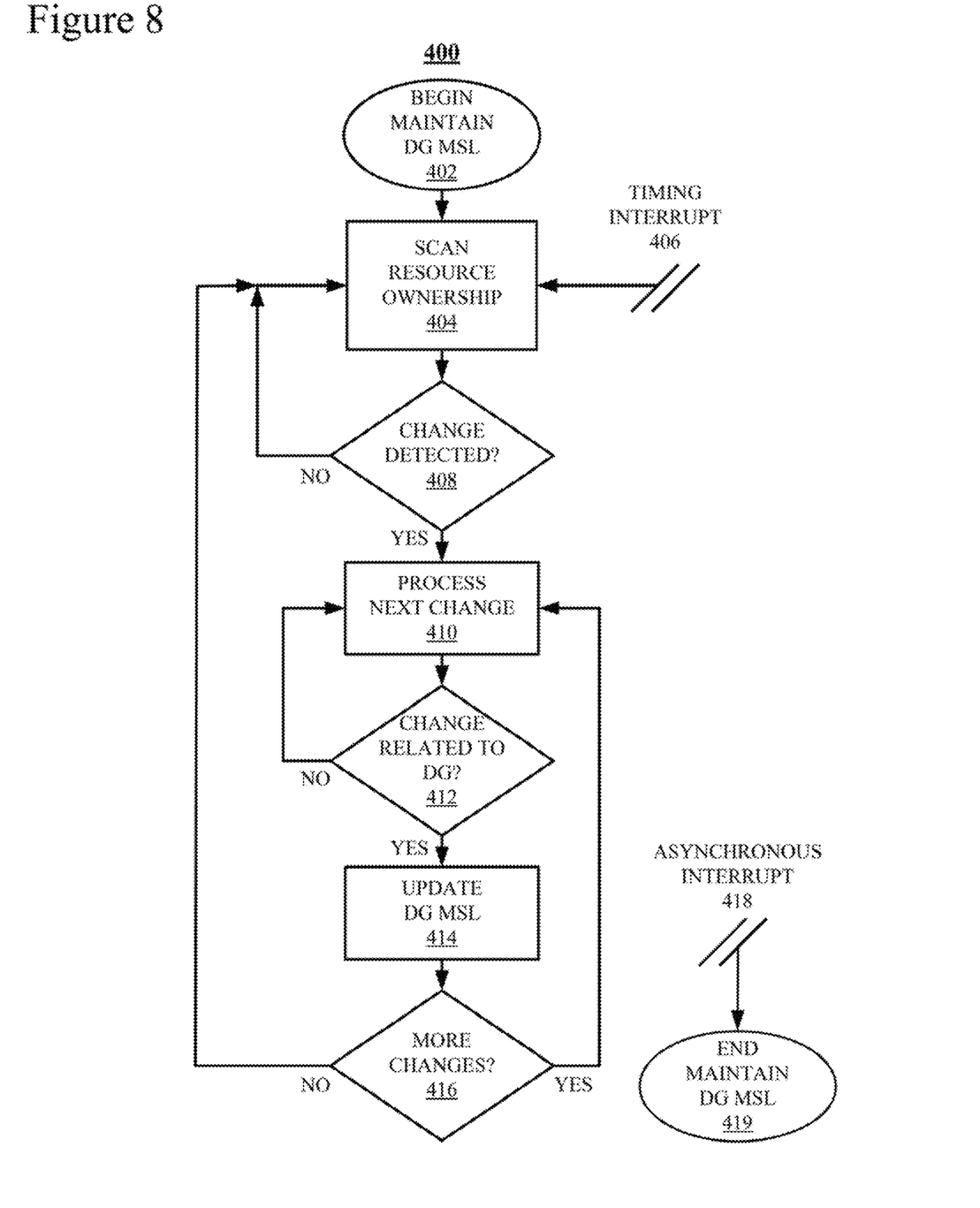
FIG. 8 is an example of a flowchart a Maintain DG MSL process that may implement aspects of the claimed subject matter.

FIG. 8 is an example of a flowchart a Maintain DG MSL process 400 that may implement aspects of the claimed subject matter. Like process 350 (FIG. 6), in this example, process 400 is associated with logic stored on CRSM 112 (FIG. 1) in conjunction with CRMA 116 (FIG. 1) and executed on one or more processors (not shown) of CPU 104 (FIG. 1) and computing system 102 (FIG. 1). In addition, process 400 is performed by TES 153 (FIG. 4).

Process 400 starts in a "Begin Maintain DG MSL" block 402 and proceeds immediately to a "Scan Resource Ownership" block 404. During processing associated with block 404, each resource that has been placed on D_1 MSL 162 (FIG. 2) (see 312, FIG. 6 is scanned for the identity of the current owner. Scanning may be based upon metadata associated with each particular resource or based upon information retrieved via representational state transfer (REST) application programming interfaces (APIs). Of course, those with skill in the relevant arts should appreciate that there are multiple means to retrieve data on specific resources, many of which may be incorporated into the disclosed techniques. Processing associated with block 404 is initiated periodically by a timing interrupt 406. The specific period between instances of timing interrupt 406 may be set by a user or administrator in conjunction with an option parameter.

During processing associated with a "Change Detected?" block 408, a determination is made as to whether or not any resource listed in D_1 MSL 162 has had a change in ownership since the last instance of timing interrupt 406 and each change in ownership is noted. If not, control returns to block 404 to wait for the next instance of interrupt 406 and processing continues as describe above and below. If so, during processing associated with block "Process Next Change" block 410, one of the unprocessed noted changes to ownership is selected for processing. During processing associated with a "Change Related to DG?" block 412, a determination is made as to whether or not the selected change is associated with any deployment group such as DG 158 (FIG. 2). If so, control proceeds to an "Update DG MSL" block 414. During processing associated with block 414 the MSL associated with the DG identified during processing associated with block 412, i.e. D_1 162, is updated to reflect the change detected during processing associated with block 408. During processing associated with a "More Changes" block 416, a determination is made as to whether or not there are any more changes to D_1 MSL 162 to be processed. If not, control returns to block 404 to wait for the next instance of interrupt 406 and processing continues as describe above and below.

If a determination is made during processing associated with block 416 that more changes detected during processing associated with block 408 are present for processing or, if during processing associated with block 412, a determination is made that the change is not related to DG 158, control returns to block 410 and the next unprocessed identified change is selected and processing continues as described above.

Finally, process 400 is halted by means of an interrupt 418, which passes control to an "End Maintain DG MSL" block 419 in which process 400 is complete. Interrupt 418 is typically generated when the OS, application, etc. of which process 400 is a part is itself halted. During normal operation, process 400 continuously loops through the blocks 404, 406, 408, 410, 412, 414 and 416, periodically processing changes to D_1 MSL 162 as they are detected.

The terminology used herein is tint the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

We claim:

1. An apparatus, comprising:
   a processor;
   a non-transitory, computer-readable storage medium (CRSM) coupled to the processor;
   a graphical user interface (GUI); and
   logic, stored on the CRSM and executed on the processor, for:
     grouping resources, stored by a particular user in a cloud environment, owned by the particular user as defined by an association of the resources with a specific userID, into a collection representing a composite application, hosted by the cloud environment, corresponding to the particular user, wherein a composite application comprises two or more applications and the resources are not resources that implement the cloud environment;
     automatically monitoring the resources across two or more virtual machines and two or more physical computing devices;
     displaying the monitored resources in the GUI in a context associated with the composite application;
     managing with the GUI the composite application, wherein the managing comprises a selection of one or more actions from a list, the list comprising:
       adding a resource to the composite application; and
       removing a resource from the composite application; and
     managing the resources of the composite application with the GUI.

2. The apparatus of claim 1, wherein the resources are provided as one or more of a platform as service (PaaS) environment and an infrastructure as Service (IaaS) environment.

3. The apparatus of claim 1, the logic for grouping comprising logic for identifying the ownership metadata associated with the resources.

4. The apparatus of claim 1, the logic for grouping comprising logic for identifying the ownership by utilizing representational state transfer (REST) application programming interfaces (APIs).

5. The apparatus of claim 1, the logic further comprising logic for:
   associating the two or more virtual machines with the composite application;
   grouping a plurality of agents associated with the two or more virtual machines into corresponding lists based upon each agents correspondence to the composite application; and
   managing the addition and removal of particular virtual machines of the two or more virtual machines from the lists based upon scaling requirements.

6. The apparatus of claim 1, the logic further comprising logic for:
   associating a user with the composite application; and
   providing, to the user, access to the monitored resources via the graphical user interface (GUI) for monitoring the monitored resources.

7. A computer programming product, comprising:
   a processor;
   a graphical user interface (GUI);
   a non-transitory, computer-readable storage medium (CRSM) coupled to the processor; and
   logic, stored on the CRSM and executed on the processor, for:
     grouping resources, stored by a particular user in a cloud environment, owned by the particular user as defined by an association of the resources with a specific userID, into a collection representing a composite application, hosted by the cloud environment, corresponding to the particular user, wherein a composite application comprises two or more applications;
     automatically monitoring the resources across two or more virtual machines and two or more physical computing devices;
     displaying the monitored resources in the GUI in a context associated with the composite application;
     managing with the GUI the composite application, wherein the managing comprises a selection of one or more actions from a list, the list comprising:
       adding a resource to the composite application; and
       removing a resource from the composite application; and
     managing the resources of the composite application with the GUI.

8. The computer programming product of claim 7, wherein the resources are provided as one or more of a platform as service (PaaS) environment and an infrastructure as Service (IaaS) environment.

9. The computer programming product of claim 7, the logic for grouping comprising logic for identifying the ownership metadata associated with the resources.

10. The computer programming product of claim 7, the logic for grouping comprising logic for identifying the ownership by utilizing representational state transfer (REST) application programming interfaces (APIs).

11. The computer programming product of claim 7, the logic further comprising logic for:
    associating the two or more virtual machines with the composite application;
    grouping a plurality of agents associated with the two or more virtual machines into corresponding lists based upon each agents correspondence to the composite application; and
    managing the addition and removal of particular virtual machines of the two or more virtual machines from the lists based upon scaling requirements.

12. The computer programming product of claim 7, further comprising:
    associating a user with the composite application; and
    providing, to the user, access to the monitored resources via the graphical user interface (GUI) for monitoring the monitored resources.

13. A cloud resource monitoring agent, comprising:
    a processor;

a graphical user interface (GUI);

a non-transitory, computer-readable storage medium (CRSM) coupled to the processor; and logic, stored on the CRSM and executed on the processor, for:

grouping resources, stored by a particular user in a cloud environment, owned b the particular user as defined by an association of the resources with a specific userID, into a collection representing a composite application, hosted by the cloud environment, corresponding to the particular user, wherein a composite application comprises two or more applications;

automatically monitoring the resources across two or more virtual machines and two or more physical computing devices;

displaying the monitored resources in the GUI in a context associated with the composite application;

managing with the GUI the composite application, wherein the managing comprises a selection of one or more actions from a list, the list comprising:

adding a resource to the composite application; and removing a resource from the composite application; and managing the resources of the composite application with the GUI.

14. The cloud resource monitoring agent of claim 13, wherein the resources are provided as one or more of a platform as service (PaaS) environment and an infrastructure as Service (IaaS) environment.

15. The cloud resource monitoring agent of claim 13, the logic for grouping comprising logic for identifying the ownership metadata associated with the resources.

16. The cloud resource monitoring agent of claim 13, the logic for grouping comprising logic for identifying the ownership by utilizing representational state transfer (REST) application programming interfaces (APIs).

17. The cloud resource monitoring agent of claim 13, the logic further comprising logic for:

associating the two or more virtual machines with the composite application;

grouping a plurality of agents associated with the two or more virtual machines into corresponding lists based upon each agents correspondence to the composite application; and managing the addition and removal of particular virtual machines of the two or more virtual machines from the lists based upon scaling requirements.

18. The cloud resource monitoring agent of claim 13, the logic further comprising logic for:

associating a user with the composite application; and providing, to the user, access to the monitored resources via the graphical user interface (GUI) for monitoring the monitored resources.

\* \* \* \* \*